US008446591B2

(12) United States Patent
Kawanishi et al.

(10) Patent No.: US 8,446,591 B2
(45) Date of Patent: May 21, 2013

(54) METHOD FOR EVALUATING CHARACTERISTICS OF OPTICAL MODULATOR HAVING MACH-ZEHNDER INTERFEROMETERS

(75) Inventors: Tetsuya Kawanishi, Tokyo (JP); Shinya Nakajima, Tokyo (JP); Satoshi Shinada, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 209 days.

(21) Appl. No.: 12/921,833

(22) PCT Filed: Mar. 13, 2008

(86) PCT No.: PCT/JP2008/000575
§ 371 (c)(1),
(2), (4) Date: Sep. 10, 2010

(87) PCT Pub. No.: WO2009/113128
PCT Pub. Date: Sep. 17, 2009

(65) Prior Publication Data
US 2011/0176141 A1   Jul. 21, 2011

(51) Int. Cl.
*G01N 21/55* (2006.01)
*G01B 9/02* (2006.01)
*H04B 10/04* (2006.01)
*H04B 10/12* (2006.01)

(52) U.S. Cl.
USPC ............................ 356/477; 356/484; 398/198

(58) Field of Classification Search
USPC .................... 398/198; 356/477, 484
See application file for complete search history.

(56) References Cited

U.S. PATENT DOCUMENTS

| 5,301,058 | A * | 4/1994 | Olshansky ................ 398/194 |
| 7,577,367 | B2 * | 8/2009 | Way ........................... 398/183 |
| 2004/0085620 | A1 | 5/2004 | Kawanishi et al. |
| 2007/0292142 | A1 | 12/2007 | Hashimoto et al. |

FOREIGN PATENT DOCUMENTS

JP    A-3-123828    5/1991

(Continued)

OTHER PUBLICATIONS

Kawanishi et al, Direct measurement of chirp parameters of high-speed Mach-Zehnder-type optical modulators,Optics Communications, vol. 195, Issues 5-6, Aug. 15, 2001, pp. 399-404.*

Courjal et al, Extinction-ratio-independent method for chirp measurements of Mach-Zehnder modulators, Optics Express, vol. 12, No. 3, Feb. 9, 2004, pp. 442-448.*

(Continued)

*Primary Examiner* — Gregory J Toatley
*Assistant Examiner* — Shawn Decenzo
(74) *Attorney, Agent, or Firm* — Posz Law Group, PLC

(57) ABSTRACT

Problems
To provide a method for evaluating characteristics of MZ interferometers in an optical modulator having a plurality of MZ interferometers.

Means for Solving Problems
When an optical modulator includes a plurality of MZ interferometers, the 0-degree component contains a signal derived from an MZ interferometer other than the MZ interferometers for evaluating the characteristic. For this, it is impossible to accurately evaluate the characteristic of the MZ interferometers. The present invention does not use the 0-degree component normally having the highest intensity. That is, the characteristic of the MZ interferometers are evaluated by using a side band intensity of the component other than the 0-degree component.

11 Claims, 3 Drawing Sheets

FOREIGN PATENT DOCUMENTS

| | | |
|---|---|---|
| JP | A-4-290940 | 10/1992 |
| JP | A-2002-244091 | 8/2002 |
| JP | A-2002-277091 | 9/2002 |
| JP | A-2003-139653 | 5/2003 |
| JP | A-2006-064868 | 3/2006 |
| WO | WO 2007/088636 | 8/2007 |

OTHER PUBLICATIONS

International Search Report mailed on May 27, 2008 for the corresponding International patent application No. PCT/JP2008/000575.

* cited by examiner

METHOD FOR EVALUATING CHARACTERISTICS OF OPTICAL MODULATOR HAVING MACH-ZEHNDER INTERFEROMETERS

TECHNICAL FIELD

The present invention relates to a method for evaluating characteristics of an optical modulator having a Mach-Zehnder interferometer (MZ interferometer). Specifically, the invention relates to a method for evaluating characteristics of an optical modulator having a plurality of Mach-Zehnder interferometers.

BACKGROUND ART

Optical information communication systems use optical modulators. Therefore, it is useful for obtaining effective optical information communication systems to understand the characteristics of the optical modulators. Examples of the parameters for defining the characteristics of the optical modulators include insertion loss, modulation index, half-wavelength voltage (Vπ), optical band, ON/OFF extinction ratio, polarized wave extinction ratio, and chirp parameter. Methods for evaluating the characteristics of optical modulators have been researched and some evaluating methods have been reported.

Japanese Patent No. 3538619 discloses an invention for measuring a power spectrum of an MZ optical modulator and obtaining a modulation index using the measured power spectrum.

Japanese Patent No. 3866082 discloses an invention for obtaining a half-wavelength voltage and a chirp parameter of an optical modulator based on a spectrum distribution of an MZ optical modulator.

The methods for evaluating the characteristics of an optical modulator disclosed in the above two documents are excellent evaluating methods. However, it is desired to obtain a method for evaluating the characteristics of an optical modulator with more accurately.

In particular, in recent years, an optical modulator including a plurality of MZ interferometers has been developed. It is desired that characteristics of individual MZ interferometers in such an optical modulator are evaluated. On the other hand, in the conventional methods for evaluating the characteristics of an optical modulator, since there is generated a noise due to an MZ interferometer whose physicality is not evaluated, suitable evaluation cannot be made.

Patent Document 1: Japanese Patent No. 3538619
Patent Document 2: Japanese Patent No. 3866082

DISCLOSURE OF THE INVENTION

Problem to be Solved by the Invention

It is an object of the present invention to provide a method for evaluating characteristics of an optical modulator accurately.

It is another object of the present invention to provide a method for evaluating characteristics of individual MZ interferometers in an optical modulator including a plurality of MZ interferometers.

Means for Solving the Problem

The present invention is based on a finding that when the characteristics of an MZ interferometer are evaluated by using a zeroth-order component of the MZ interferometer, it is impossible to evaluate in accurate. Particularly, when an optical modulator includes a plurality of MZ interferometers, a zeroth-order component includes signals originating from MZ interferometers other than the MZ interferometer whose characteristics are evaluated. For this reason, the characteristics of the MZ interferometer cannot be accurately evaluated. In the present invention, normally the zeroth-order component for providing the highest intensity is not used for the evaluation of the characteristics. As a result, the characteristics of the MZ interferometer can be accurately evaluated.

The first aspect of the present invention relates to a method for evaluating characteristics of an optical modulator including a Mach-Zehnder interferometer (MZ interferometer). The MZ interferometer includes a branching section, two arms, a coupling section, and electrodes. The two arms are connected to the branching section. The coupling section is connected to the two arms. The electrodes make it possible to apply bias voltages to the two arms, and to apply modulation signals to the two arms. This method includes a step of applying a driving signal, a step of sweeping a bias voltage, a step of measuring output intensity, and a step of evaluating characteristics.

The step of applying a driving signal is a step of applying driving signal to the MZ interferometer. The step of sweeping a bias voltage is a step of sweeping a bias voltage to be applied to the MZ interferometer. The step of measuring output intensity is a step of measuring output intensity from the MZ interferometer while the bias voltage is being swept at the step of sweeping the bias voltage. The step of evaluating characteristics is a step of evaluating characteristics of the MZ interferometer using intensities of components other than a zeroth-order component in output from the MZ interferometer measured at the step of measuring output intensity.

The method according to the first aspect is for evaluating the characteristics of the MZ interferometer without using the zeroth-order component included in the output light. For this reason, the characteristics of a certain MZ interferometer in the optical modulator including a plurality of MZ interferometers can be effectively evaluated.

In a preferable pattern of the method according to the first aspect, the above-described MZ interferometer is the first MZ interferometer. The optical modulator further includes the second MZ interferometer. The second MZ interferometer is different from the first MZ interferometer.

The present invention enables the effective evaluation of the characteristics of a certain MZ interferometer in the optical modulator including a plurality of MZ interferometers.

A preferable pattern of the method according to the first aspect is that the method evaluates the character, η, that relates to imbalance of light amplitude between the two arms.

The imbalance of light amplitude between the two arms is an important factor for the character of MZ interferometer. Thus if we obtain η or η related value then we could modify MZ interferometer suitably. This pattern may apply all of the features described above.

A preferable pattern of the method according to the first aspect is that the method evaluates a chirp parameter and a modulation index.

The chirp parameter (α) is an important factor for the character of MZ interferometer. Thus if we obtain alpha or alpha related value then we could modify MZ interferometer suitably. The modulation index ($A_1$ and $A_2$) is also an important factor for the character of MZ interferometer. This pattern may apply all of the features or patterns described above.

A preferable pattern of the method according to a first aspect is that sideband intensities of a first-order component to a fourth-order component in the output from the MZ interferometer measured at the step of measuring output intensity are obtained at the characteristics evaluating step. The characteristics of the MZ interferometer are evaluated based on the obtained sideband intensities of the first-order component to the fourth-order component.

A second aspect of the present invention relates to a method for evaluating the characteristics of the optical modulator including the Mach-Zehnder interferometer (MZ interferometer). The MZ interferometer includes a branching section, two arms, a coupling section, and an electrode. The two arms are connected to the branching section. The coupling section is connected to the two arms. The electrode can apply bias voltages to the two arms, and apply modulation signals to the two arms.

A method according to a second aspect includes a step of applying a driving signal, a step of adjusting a bias voltage, a step of measuring output intensity and a step of evaluating characteristics. The step of applying a driving signal is a step of applying a driving signal to an MZ interferometer. The step of adjusting a bias voltage is a step of setting a phase difference between bias voltages to be applied to two arms of the MZ interferometer to $\pi$ (pi) or a step of setting the phase difference between the bias voltages to be applied to the two arms of the MZ interferometer to 0. The step of measuring output intensity is a step of measuring the output intensity from the MZ interferometer whose bias voltage is adjusted at the step of adjusting a bias voltage. The step of evaluating characteristics is a step of evaluating characteristics of the MZ interferometer using intensity of the sideband component of the second-order component in the output from the MZ interferometer measured at the step of measuring the output intensity.

The method according to the second aspect is for evaluating the characteristics of the MZ interferometer without using the zeroth-order component included in the output light. For this reason, the characteristics of a certain MZ interferometer in the optical modulator including a plurality of MZ interferometers can be effectively evaluated.

In a preferable pattern of the method according to the second aspect, the above-described MZ interferometer is a first MZ interferometer. In this case, the optical modulator further includes a second MZ interferometer. The second MZ interferometer is different from the first MZ interferometer.

According to the present invention, the characteristics of a certain MZ interferometer in the optical modulator including a plurality of MZ interferometers can be effectively evaluated.

A preferable pattern of the method according to the second aspect is that the method evaluates the character, $\eta$, that relates to imbalance of light amplitude between the two arms.

The imbalance of light amplitude between the two arms is an important factor for the character of MZ interferometer. Thus if we obtain $\eta$ or $\eta$ related value then we could modify MZ interferometer suitably. This pattern may apply all of the features described above.

A preferable pattern of the method according to the second aspect is that the method evaluates a chirp parameter and a modulation index.

The chirp parameter ($\alpha$) is an important factor for the character of MZ interferometer. Thus if we obtain alpha or alpha related value then we could modify MZ interferometer suitably. The modulation index ($A_1$ and $A_2$) is also an important factor for the character of MZ interferometer. This pattern may apply all of the features described above.

A preferable pattern of the method according to the second aspect is such that the bias voltage is adjusted so that the odd-order components of the output light from the MZ interferometer become maximum and the even-order components other than the zeroth-order component become minimum. Thereby, the phase difference between the bias voltages to be applied to the two arms of the MZ interferometer to be $\pi$ (pi). The bias voltage may be set so that the first-order components become maximum to simplify the adjustment. It may be possible to only controls for the second-order component to become minimum. Then the phase difference between bias voltage may be controlled without influenced by other MZ interferometers.

A preferable pattern of the method according to the second aspect is such that the bias voltage is adjusted so that the odd-order components of the output light from the MZ interferometer become minimum and the even-order components other than the zeroth-order component become maximum. Thereby, the phase difference between the bias voltages to be applied to the two arms of the MZ interferometer to be 0. The bias voltage may be set so that the second-order components become minimum to simplify the adjustment. It may be possible to only controls for the second-order component to become maximum. Then the phase difference between bias voltage may be controlled to be 0 easily.

That is, in a preferable pattern from the second aspect, the step of setting the phase difference between the bias voltages to be applied to the two arms of the MZ interferometer to $\pi$ (pi) includes a step of applying signals having skew to the two arms. The skew is a phase difference between RF (Radio Frequency) signals (modulation signals) to be applied to the two arms. Then skew (namely, the phase difference between the RF signals to be applied to the two arms) may be swept. While the skew is being swept, the outputs from the MZ interferometer are measured. In this state, a determination is made whether the symmetric property is maintained between the measured outputs from the MZ interferometer. When the determination is made that the symmetric property is maintained between the outputs from the MZ interferometer, a determination is made that the phase difference between the bias voltages is $\pi$ (pi). On the other hand, when the determination is made that the symmetric property is not maintained between the outputs from the MZ interferometer, the determination is made that the phase difference between the bias voltages is not $\pi$ (pi). As a result, the bias point can be confirmed as being accurately bias null.

In a preferable pattern of the invention according to the second aspect, the step of setting the phase difference between the bias voltages to be applied to the two arms of the MZ interferometer to $\pi$ (pi) includes a step of applying signals having skew to the two arms. The outputs from the MZ interferometer at the time of sweeping the skew are measured. Further, the step includes a step of determining whether a difference between the intensity of the first-order component and the intensity of the minus first-order component in the measured outputs from the MZ interferometer is within a constant range. That is, if the first-order component and the minus first-order component maintain the similar intensity even when the skew changes, the symmetric property is maintained between the second-order component and the minus second-order component. Then the bias is bias null (or bias full). Therefore, according to this pattern, the accurate bias null can be confirmed.

In a preferable pattern of the invention according to the second aspect, the step of setting the phase difference between the bias voltages to be applied to the two arms of the MZ interferometer to $\pi$ (pi) includes a step of applying signals having skew to the two arms. The outputs from the MZ interferometer at the time of sweeping the skew are measured. Further, the step includes a step of determining whether a difference between the intensity of the second-order component and the intensity of the minus second-order component in the measured outputs from the MZ interferometer is within a constant range. That is, if the second-order component and the minus second-order component maintain the similar intensity even when the skew changes, the symmetric property is maintained between the second-order component and the minus second-order component. Therefore, according to this pattern, the accurate bias null can be confirmed.

In a preferable pattern from the second aspect, the step of setting the phase difference between the bias voltages to be applied to the two arms of the MZ interferometer to 0 includes a step of applying signals having skew to the two arms. The skew is a phase difference between RF (Radio Frequency) signals (modulation signals) to be applied to the two arms. Then skew (namely, the phase difference between the RF signals to be applied to the two arms) may be swept. While the skew is being swept, the outputs from the MZ interferometer are measured. In this state, a determination is made whether the symmetric property is maintained between the measured outputs from the MZ interferometer. When the determination is made that the symmetric property is maintained between the outputs from the MZ interferometer, a determination is made that the phase difference between the bias voltages is 0. On the other hand, when the determination is made that the symmetric property is not maintained between the outputs from the MZ interferometer, the determination is made that the phase difference between the bias voltages is not 0. As a result, the bias point can be confirmed as being accurately bias full.

In a preferable pattern of the invention according to the second aspect, the step of setting the phase difference between the bias voltages to be applied to the two arms of the MZ interferometer to 0 includes a step of applying signals having skew to the two arms. The outputs from the MZ interferometer at the time of sweeping the skew are measured. Further, the step includes a step of determining whether the difference between the intensity of the first-order component and the intensity of the minus first-order component in the measured outputs from the MZ interferometer is within a predetermined range. That is, if the first-order component and the minus first-order component maintain the similar intensity even when the skew changes, the symmetric property is maintained between the first-order component and the minus first-order component. Therefore, according to this pattern, the accurate bias full can be confirmed.

In a preferable pattern of the invention according to the second aspect, the step of setting the phase difference between the bias voltages to be applied to the two arms of the MZ interferometer to 0 includes a step of applying signals having skew to the two arms. The outputs from the MZ interferometer at the time of sweeping the skew are measured. Further, the step includes a step of determining whether a difference between the intensity of the second-order component and the intensity of the minus second-order component in the measured outputs from the MZ interferometer is within a constant range. That is, if the second-order component and the minus second-order component maintain the similar intensity even when the skew changes, the symmetric property is maintained between the second-order component and the minus second-order component. Therefore, according to this pattern, the accurate bias full can be confirmed.

The method according to the third aspect includes a step of adjusting bias voltage, a step of measuring output intensity, and a step of evaluating characteristics. At the step of adjusting bias voltage, a voltage is set to be in the middle of a voltage with which a phase difference between the bias voltages to be applied to the two arms of the MZ interferometer becomes 0 and a voltage with which the phase difference becomes $\pi$. At the step of measuring output intensity, intensities of high-order components included in the output light from the MZ interferometer are obtained. At the step of evaluating characteristics, the characteristics of the MZ interferometer are evaluated by using a ratio between the high-order components measured at the output intensity measuring step. The method may comprise any features of the first aspect and the second aspect.

Technical Effect

The present invention may provide a method for evaluating characteristics of an optical modulator accurately.

The present invention may provide a method for evaluating characteristics of individual MZ interferometers in an optical modulator including a plurality of MZ interferometers.

Figure 1:
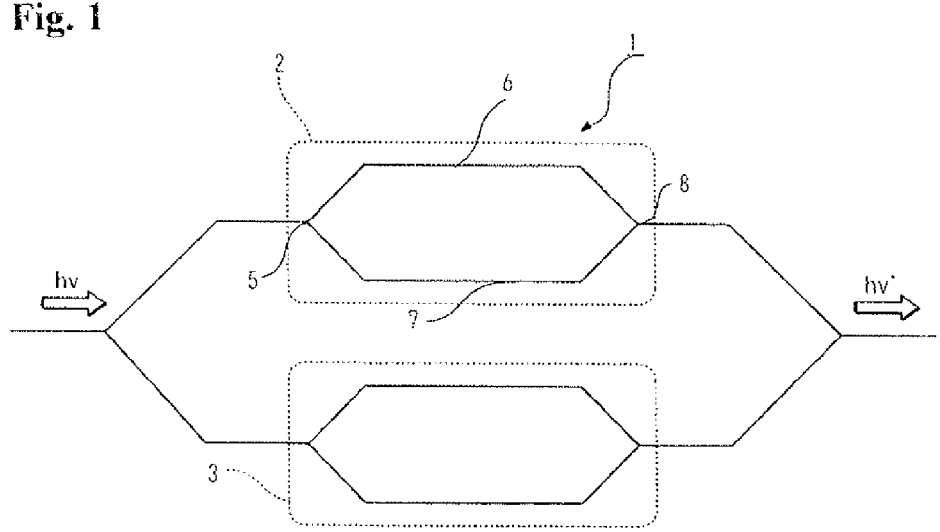
FIG. 1 is a diagram which illustrates an example of the optical modulator including a Mach-Zehnder interferometer.

EXPLANATION OF ELEMENT NUMERALS 1 an optical modulator
2 the first Mach-Zehnder interferometer
3 the second Mach-Zehnder interferometer
5 branching section
6 the first arm
7 the second arm
8 coupling section

THE BEST MODE FOR CARRYING OUT THE INVENTION

The first aspect of the present invention relates to a method for evaluating characteristics of an optical modulator including a Mach-Zehnder interferometer (MZ interferometer). The MZ interferometer includes a branching section, two arms, a coupling section, and electrodes. The two arms are connected to the branching section. The coupling section is connected to the two arms. The electrodes make it possible to apply bias voltages to the two arms, and can apply modulation signals to the two arms.

FIG. 1 is a diagram which illustrates an example of the optical modulator including a Mach-Zehnder interferometer. The optical modulator (1) includes the first Mach-Zehnder interferometer (2) and the second Mach-Zehnder interferometer (3). The first Mach-Zehnder interferometer (2) includes branching section (5), two arms (6 and 7), coupling section (8) and an electrode (not shown). The MZ interferometer and the optical modulator including the MZ interferometer are publicly known. The first arm is denoted by the reference numeral 6, and the second arm is denoted by the reference numeral 7. A Mach-Zehnder waveguide or an electrode is generally provided on a substrate. The material of a substrate and each waveguide is not specifically limited if light can propagate therethrough. For example, a lithium niobate waveguide with a Ti diffusion may be formed on an LN substrate, and a silicon dioxide ($SiO_2$) waveguide may be formed on a silicon (Si) substrate. Also, an optical semiconductor waveguide such as an InGaAsP waveguide (a GaAlAs waveguide) formed on an indium phosphide substrate (a GaAs substrate) may be used. The substrate is preferably formed of lithium niobate ($LiNbO_3$: LN) and cut out in a direction orthogonal to the X-axis (X-cut), and light is propagated in a Z-axis direction (Z-axis propagation). This is because a low-power-consumption drive and a superior response speed can be achieved due to dynamic electrooptic effect. An optical waveguide is formed in the surface portion of a substrate having an X-cut plane (YZ plane), and guided light propagates along the Z-axis (the optic axis). A lithium niobate substrate except the X-cut may be used. As a substrate, it is possible to use a material of a one-axis crystal having a crystal system such as a trigonal system and a hexagonal system and having electro optical effect or a material in which a point group of a crystal is $C_{3v}$, $C_3$, $D_3$, $C_{3h}$, and $D_{3h}$. These materials have a refractive index adjusting function in which a change in the refractive index due to the application of an electric field has a different sign depending on a mode of a propagation light. As a specific example, lithium tantalite oxide ($LiTO_3$: LT), $\beta$-$BaB_2O_4$ (abbr. BBO), $LiIO_3$ and the like can be used other than lithium niobate.

Figure 2:
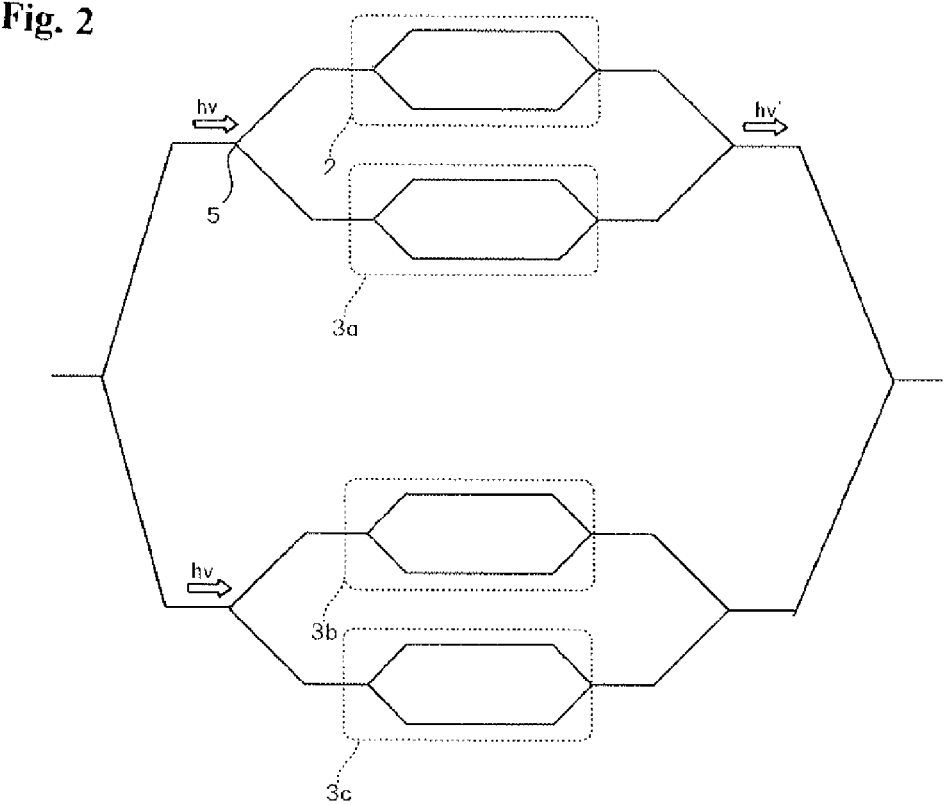
FIG. 2 is a diagram illustrating an example of an optical modulator having a plurality of Mach-Zehnder interferometers.

FIG. 2 is a diagram illustrating an example of an optical modulator having a plurality of Mach-Zehnder interferometers. This optical modulator has two main Mach-Zehnder interferometers. Each of the main Mach-Zehnder interferometers has two sub Mach-Zehnder waveguides. In this example, the Mach-Zehnder interferometer to be evaluated is denoted by the reference numeral 2. On the other hand, this optical modulator includes the Mach-Zehnder interferometers (3a, 3b and 3c) other than the target to be evaluated. The optical modulator shown in FIG. 2 functions as a quadrature amplitude modulation (QAM) signal generating apparatus. That is, the present invention can be effectively used for evaluating characteristics of a certain Mach-Zehnder waveguide included in the quadrature amplitude modulation (QAM) signal generating apparatus.

Figure 3:
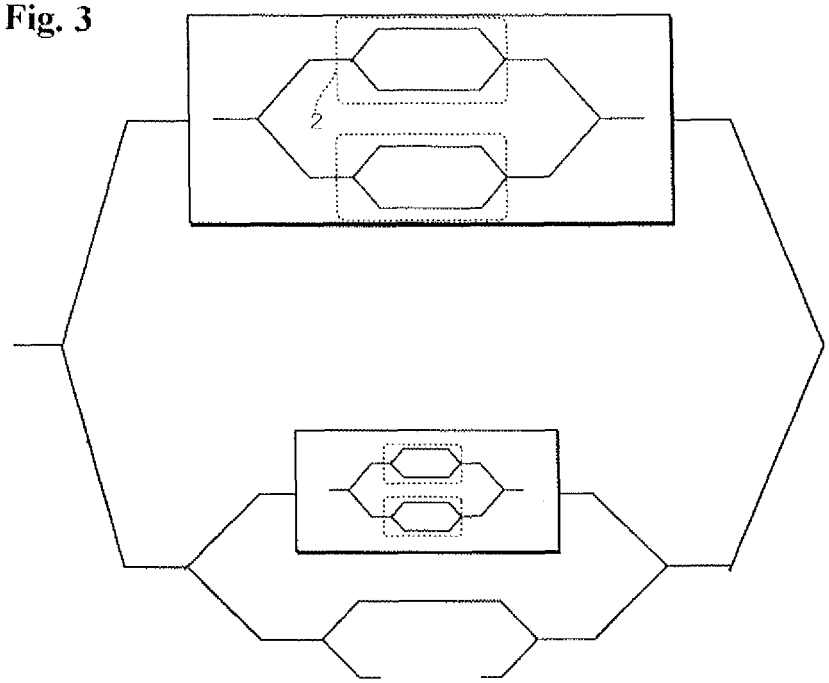
FIG. 3 is a diagram illustrating an example of an optical modulator including a plurality of Mach-Zehnder interferometers.

FIG. 3 is a diagram illustrating an example of an optical modulator including a plurality of Mach-Zehnder interferometers. As to this optical modulator, a plurality of modulators including a Mach-Zehnder waveguide is arranged.

A wave function of input light to the MZ interferometer can be expressed by $\exp(i\omega_0 t)$. A phase of the optical signal propagating through both the arms of the MZ interferometer can be expressed as follows.

$$A_1 \sin(\omega_m t + \phi_1) + B_1, A_2 \sin(\omega_m t + \phi_2) + B_2 \quad \text{[Mathematical Formula 1]}$$

In the above formula, $\omega_0$ represents an angular frequency of light, $A_1$ and $A_2$ represent parameters (modulation indexes) showing depths of modulation on the arms, $\omega_m$ represents an angular frequency of a modulation signal, $\phi_1$ and $\phi_2$ represent different phases of the modulation signals of the arms, and $B_1$ and $B_2$ represent phases of both the arms according to a structure and a state of the waveguide.

On the other hand, when the optical modulator comprises a plurality of MZ interferometers, non-modulated signal from these MZ interferometers can not be ignored. Non-modulated signal from other MZ interferometers is defined as $G \exp(i\omega_0 t)$. An output from the MZ interferometer can be expressed as follows.

[Mathematical Formula 2]

$$\frac{e^{i\omega_0 t}}{2} \sum_{n=-\infty}^{\infty} e^{in\omega_m t} \left[ J_n(A_1) e^{in\phi_1} \cdot e^{iB_1} \left(1 + \frac{\eta}{2}\right) + J_n(A_2) e^{in\phi_2} \cdot e^{iB_2} \left(1 - \frac{\eta}{2}\right) \right] + G e^{i\omega_0 t}$$

In the above formula, n represents an order, and $\eta$ represents an extinction ratio relating to imbalance of light amplitude between the two arms. Further, $J_n$ is Bessel function of the first kind.

When a phase difference in an RF signal between the arms is ignored, $\phi_1 = \phi_2 = 0$ can be satisfied. $\alpha'$ is $A\alpha_0$, $A_1$ is $A+\alpha'$, and $A_2$ is $-A+\alpha'$. As a result, the output from the MZ interferometer can be expressed as follows. The output at the time of bias null ($B_1 = 0$, $B_2 = \pi$) is as follows.

[Mathematical Formula 3]

$$\frac{e^{i\omega_0 t}}{2} \sum_{n=-\infty}^{\infty} e^{in\omega_m t} \left[ J_n(A + \alpha')\left(1 + \frac{\eta}{2}\right) + J_n(-A + \alpha')\left(1 - \frac{\eta}{2}\right) e^{iB} \right] e^{iB_1} + G e^{i\omega_0 t}$$

That is, when the characteristics are evaluated by using the zeroth-order component in a conventional manner, components originating from a plurality of MZ interferometers become large, and thus suitable evaluation cannot be performed.

n represents an integer of 1 or more. The nth-order sideband intensity is represented by $S_n$. The intensity of the sideband component depends on a bias voltage. In order to eliminate this property, for example, the bias voltage is swept by an integral multiple of a half-wave voltage. When changes in the sideband components due to the bias voltage are averaged, $S_n$ can be expressed as follows.

[Mathematical Formula 4]

$$S_n = \frac{1}{4}\left[\left\{J_n(A + \alpha')\left(1 + \frac{\eta}{2}\right)\right\}^2 + \left\{J_n(A - \alpha')\left(1 - \frac{\eta}{2}\right)\right\}^2\right]$$

$$= \frac{1}{4}\left[J_n^2(A + \alpha')\left(1 + \eta + \frac{\eta^2}{4}\right) + J_n^2(A - \alpha')\left(1 - \eta + \frac{\eta^2}{4}\right)\right]$$

$$= \frac{1}{4}\left[\{J_n^2(A + \alpha') + J_n^2(A - \alpha')\}\left(1 + \frac{\eta^2}{4}\right) + \eta\{J_n^2(A + \alpha') - J_n^2(A - \alpha')\}\right]$$

A derived function Jn'(A) of in is defined as follows.

$$J_n'(A) = J_{n-1}(A) - n\frac{J_n(A)}{A} \quad \text{[Mathematical Formula 5]}$$

When $\alpha_0$ and $\eta$ are sufficiently smaller than 1, $S_n$ can be expressed as follows:

[Mathematical Formula 6]

$$S_n = \frac{1}{4}[2J_n^2(A) + \eta \cdot 2J_n(A) \cdot 2J_n'(A)\alpha']$$
$$= \frac{1}{2}\left[J_n^2(A) + 2\eta\alpha'\left\{J_n(A)J_{n-1}(A) - n\frac{J_n^2(A)}{A}\right\}\right]$$
$$= \frac{1}{2}\left[J_n^2(A)\left\{1 - \frac{2\eta\alpha'n}{A}\right\} + 2\eta\alpha' J_n(A)J_{n-1}(A)\right]$$

Therefore, $S_1$, $S_2$, $S_3$ and $S_4$ are measured, and a simultaneous equation using their ratios (for example, $S_2/S_1$, $S_3/S_1$ and $S_4/S_1$) is solved so that A, $\eta$ and $\alpha'$ can be obtained. $R_{xy}$ is defined as $S_y/S_x$. Further, the following is defined.

$$J_n^{k\pm} \equiv J_n^k(A+\alpha') \pm J_n^k(A-\alpha') \quad \text{[Mathematical Formula 7]}$$

As a result, $R_{1n}$ can be expressed as follows.

[Mathematical Formula 8]

$$R_{1n} = \frac{J_n^{2+}\left(1 + \frac{\eta^2}{4}\right) + J_n^{2-}\eta}{J_1^{2+}\left(1 + \frac{\eta^2}{4}\right) + J_1^{2-}\eta} \cong \frac{J_n^{2+} + J_n^{2-}\eta}{J_1^{2+} + J_1^{2-}\eta}$$

When ratios between the first-order sideband intensity and the second- to fourth-order sideband intensities are used to evaluate the characteristics of the MZ interferometer, the above formula may be used.

The first aspect of the present invention includes the step of applying a driving signal, the step of sweeping a bias voltage, the step of measuring output intensity, and the step of evaluating characteristics.

The step of applying a driving signal is a step of applying a driving signal to the MZ interferometer. The driving signal is a sinusoidal wave. A driving frequency of the driving signal is 1 to 10 GHz. Since this step is a step similar to the case of driving the MZ interferometer, it can be easily realized. This step may be automatically executed based on a control device. That is, an optical modulator includes, for example, a driving signal source and a control device. The control device reads a control program. The control device gives a command to the driving signal source based on the read control program. The driving signal source receives the command from the control device. The driving signal source applies a driving signal to an electrode of the MZ interferometer according to the control command. In such a manner, the driving signal can be applied to the MZ interferometer.

The step of sweeping a bias voltage is a step of sweeping a bias voltage to be applied to the MZ interferometer. An influence originating from bias can be eliminated by sweeping the bias voltage. This step can be easily achieved by adjusting the voltage to be applied to the bias electrode. This step may be automatically executed based on the control device. That is, the optical modulator includes, for example, the bias power source and the control device. The control device reads a control program. The control device gives a command to the bias power source based on the read control program. The bias power source receives the command form the control device. The bias power source sweeps the bias voltage to the electrode of the MZ interferometer according to the control command. In such a manner, the bias voltages to be applied to two arms of the interferometer can be swept. A range of the voltage to be changed at the time of sweeping is allowed to match with an integral multiple of a half-wave voltage (a voltage necessary for turning on/off the interferometer) of the electrode to which the bias voltage is applied. The sweeping method includes a method using a value measured in advance and a method for changing a center value of the sweep voltage and simultaneously changing the range of the sweep voltage, and searching for the range of the voltage where a spectrum does not depend on a change in the center value. The latter method utilizes the property that the spectrum does not depend on the center value of sweep only when the changing range of the sweep voltage matches with an integral multiple of the half-wave voltage.

The step of measuring the output intensity is a step of sweeping a bias voltage at the bias voltage sweeping step and measuring the output intensity from the MZ interferometer. The output intensity includes the sideband intensities of the first-order component to fourth-order component as described above. The optical modulator includes, for example, a light detector. The light detector measures output light from the MZ interferometer. The light detector obtains intensity information about a predetermined peak from a detected spectrum of the output light. Specifically, the sideband intensities of the first-order component to the fourth-order component are extracted. This step may be automatically executed based on the control device. That is, the control device includes the control program. The control device stores frequencies of the first-order component to the fourth-order component. The control device receives the information about the output spectrum of the MZ interferometer from the light detector. As a result, the control device extracts the sideband intensities of the first-order component to the fourth-order component from the output spectrum using the information about the frequencies of the first-order component to the fourth-order component.

The step of evaluating characteristics is a step of evaluating the characteristics of the MZ interferometer using intensities of components other than the zeroth-order component in the output from the MZ interferometer measured at the output intensity measuring step. As described above, an nth-order sideband intensity can be expressed as follows.

[Mathematical Formula 9]

$$S_n = \frac{1}{2}\left[J_n^2(A)\left\{1 - \frac{2\eta\alpha'n}{A}\right\} + 2\eta\alpha' J_n(A)J_{n-1}(A)\right]$$

Further, $R_{1n}$ can be expressed as follows.

[Mathematical Formula 10]

$$R_{1n} \cong \frac{J_n^{2+} + J_n^{2-}\eta}{J_1^{2+} + J_1^{2-}\eta}$$

Therefore, n=1 to 4 is measured, three nonlinear simultaneous equations of $R_{12}$, $R_{13}$ and $R_{14}$ are solved, so that A, $\eta$ and $\alpha'$ can be obtained.

This step may be automatically executed. That is, the light detector further includes the control device. The control device has a program for solving the simultaneous equation and a program for handling a Bessel function. At the above step, $S_1$ to $S_4$ can be obtained. Therefore, $R_{12}$, $R_{13}$ and $R_{14}$ can be easily obtained based on $S_1$ to $S_4$ by using a table and a multiplier. Further, $R_{12}$, $R_{13}$ and $R_{14}$ can be easily obtained based on $S_1$ to $S_4$ by using software. A, $\eta$ and $\alpha'$ can be obtained by the program for solving this simultaneous equation.

The method according to the first aspect is for evaluating the characteristics of the MZ interferometer without using the zeroth-order component included in the output light. For this reason, the characteristics of a certain MZ interferometer in the optical modulator including a plurality of MZ interferometers can be effectively evaluated.

In a preferable pattern of the method according to the first aspect, the above-described MZ interferometer is the first MZ interferometer. The optical modulator further includes the second MZ interferometer. The second MZ interferometer is different from the first MZ interferometer.

The present invention enables the effective evaluation of the characteristics of a certain MZ interferometer in the optical modulator including a plurality of MZ interferometers.

A preferable pattern of the method according to the first aspect is that the method evaluates the character, $\eta$, that relates to imbalance of light amplitude between the two arms.

The imbalance of light amplitude between the two arms is an important factor for the character of MZ interferometer. Thus if we obtain $\eta$ or $\eta$ related value then we could modify MZ interferometer suitably. This pattern may apply all of the features described above.

A preferable pattern of the method according to the first aspect is that the method evaluates a chirp parameter and a modulation index.

The chirp parameter (alpha) is an important factor for the character of MZ interferometer. Thus if we obtain alpha or alpha related value then we could modify MZ interferometer suitably. The modulation index ($A_1$ and $A_2$) is also an important factor for the character of MZ interferometer. This pattern may apply all of the features described above.

A second aspect of the present invention relates to a method for evaluating the characteristics of the optical modulator including the Mach-Zehnder interferometer (MZ interferometer). The MZ interferometer includes a branching section, two arms, a coupling section, and an electrode. The two arms are connected to the branching section. The coupling section is connected to the two arms. The electrode can apply bias voltages to the two arms, and apply modulation signals to the two arms.

When $\alpha_0$ and $\eta$ are sufficiently smaller than 1, $S_n$ can be expressed as follows.

[Mathematical Formula 11]

$$S_n = \frac{1}{2}\left[J_n^2(A)\left\{1 - \frac{2\eta\alpha'n}{A}\right\} + 2\eta\alpha' J_n(A)J_{n-1}(A)\right]$$

A case where a phase difference between the bias voltages to be applied to both arms is 0 or $\pi$ is described below. A square root of the nth-order sideband intensity at the time of bias full is expressed by $T_n^{(+)}$, and a square root of the nth-order sideband intensity at the time of bias null is expressed by $T_n^{(-)}$. As a result, the square root can be expressed as follows.

[Mathematical Formula 12]

$$|T_n^{(\pm)}| \cong \frac{1}{2}\left|J_n(A+\alpha')\left(1+\frac{\eta}{2}\right) \pm (-1)^n J_n(A-\alpha')\left(1-\frac{\eta}{2}\right)\right|$$

When $\eta$ is small, the nth-order sideband intensity can be approximately expressed as follows.

[Mathematical Formula 13]

$$\{T_n^{(\pm)}\}^2 \cong \frac{1}{2}\{J_n(A+\alpha') \pm (-1)^n \pm J_n(A-\alpha')\}^2 + \{J_n^2(A+\alpha') - J_n^2(A-\alpha')\}^2\eta$$

Therefore, the first- to third-order sidebands at the time of bias full can be expressed as follows.

[Mathematical Formula 14]

$$|T_1^{(+)}| = \frac{1}{2}\left|J_1(A+\alpha')\left(1+\frac{\eta}{2}\right) - J_1(A-\alpha')\left(1-\frac{\eta}{2}\right)\right|$$

$$|T_2^{(+)}| = \frac{1}{2}\left|J_2(A+\alpha')\left(1+\frac{\eta}{2}\right) - J_2(A-\alpha')\left(1-\frac{\eta}{2}\right)\right| \cong J_2(A)$$

$$|T_3^{(+)}| = \frac{1}{2}\left|J_3(A+\alpha')\left(1+\frac{\eta}{2}\right) - J_3(A-\alpha')\left(1-\frac{\eta}{2}\right)\right|$$

On the other hand, the first- to third-order sidebands at the time of bias null can be expressed as follows.

[Mathematical Formula 15]

$$|T_1^{(-)}| = \frac{1}{2}\left|J_1(A+\alpha')\left(1+\frac{\eta}{2}\right) + J_1(A-\alpha')\left(1-\frac{\eta}{2}\right)\right| \cong J_1(A)$$

$$|T_2^{(-)}| = \frac{1}{2}\left|J_2(A+\alpha')\left(1+\frac{\eta}{2}\right) - J_2(A-\alpha')\left(1-\frac{\eta}{2}\right)\right|$$

$$|T_3^{(-)}| = \frac{1}{2}\left|J_3(A+\alpha')\left(1+\frac{\eta}{2}\right) + J_3(A-\alpha')\left(1-\frac{\eta}{2}\right)\right| \cong J_3(A)$$

Therefore, extinction ratios $\eta$, $\alpha'$ and A can be obtained based on the sideband intensities at the time of bias full and bias null. That is, A can be obtained based on the second-order sideband at the time of bias full. On the other hand, when the bias of the MZ interferometer is shaken, $\eta$ can be changed. As a result, $\alpha'$ can be obtained. When A and $\alpha'$ can be obtained, $\eta$ at the time of bias null can be obtained.

That is, the second aspect of the present invention includes a step of applying a driving signal, a step of adjusting a bias voltage, a step of measuring output intensity and a step of evaluating characteristics.

The step of applying a driving signal is a step of applying a driving signal to the MZ interferometer. This step is similar to that according to the first aspect.

The step of adjusting a bias voltage is a step of setting the phase difference between the bias voltages to be applied to the two arms of the MZ interferometer to $\pi$ or a step of setting the phase difference between the bias voltages to be applied to the two arms of the MZ interferometer to 0. This step can be easily achieved by adjusting a voltage to be applied to the bias voltage. This step may be automatically executed based on the control device. That is, the optical modulator includes, for example, a bias power source and a control device. The control device reads a control program. The control device gives a command to the bias power source base on the read control program. The bias power source receives the command from the control device. The bias power source applies a bias voltage to the electrode of the MZ interferometer according to the control command. In such a manner, the phase difference between the bias voltages to be applied to the two arms of the MZ interferometer can be set to 0 or $\pi$.

Normally, a bias full state and a bias null state are controlled by using the intensity of the zeroth-order component of the output light. On the other hand, when the optical modulator includes an MZ interferometer other than the MZ interferometer to be evaluated, a noise originating from the another MZ interferometer is generated in the zeroth-order component. Therefore, it is difficult to accurately distinguish between the bias-full state and the bias-null state using the zeroth-order component. Therefore, in the present invention, it is preferable to distinguish between the bias full state and the bias null state by using a high-order component. In the case of bias full, the bias voltage only needs to be adjusted so that even-order (second-, fourth- or sixth-order) components become maximum, and odd-order components including first-order (first-, third- or fifth-order) components become minimum. Further, in the case of bias null, the bias only needs to be set so that odd-order components including first-order (first-, third- or fifth-order) components become maximum and even-order components including zeroth-order (second-, fourth- or sixth-order) components become minimum. That is, in order to set the phase difference between the bias voltages to be applied to the two arms of the MZ interferometer to $\pi$, the bias-null state only needs to be obtained. For this reason, the bias only needs to be set so that the odd-order components including the first-order (first-, third- or fifth-order) components become maximum and the even-order components including the zeroth-order (second-, fourth- or sixth-order) components become minimum. For example, attention is paid only to the first-order component, and the control may be made so that the first-order component becomes maximum. Further, attention is paid only to the second-order component, and the control may be made so that the second-order component becomes minimum. That is, in a preferable pattern of the method according to the first aspect, the bias voltage is adjusted so that the odd-order components of the output light from the MZ interferometer become maximum and the even-order components other than the zeroth-order component become minimum. As a result, the phase difference between the bias voltages to be applied to the two arms of the MZ interferometer is set to $\pi$ (pi). This step can be achieved by adjusting the bias voltages while analyzing the spectrum detected by the light detector. Further, the control section may automatically analyze the spectrum detected by the light detector and give a command for changing the bias voltages to the bias power source. In such a system, the bias-null state can be automatically obtained. The bias voltage may be adjusted so that the first-order component of the output light from the MZ interferometer becomes maximum more easily. Alternatively, the bias voltage may be adjusted so that the second-order component of the output light from the MZ interferometer becomes minimum. As a result, the phase difference between the bias voltages can be controlled effectively without an influence of another MZ interferometer. In a preferable pattern of the method according to the second aspect, the bias voltage is adjusted so that the odd-order components of the output light from the MZ interferometer become minimum and the even-order components other than the zeroth-order component become maximum. As a result, the phase difference between the bias voltages to be applied to the two arms of the MZ interferometer can be zero. Further, in order to make control more easily, the bias voltage may be adjusted so that the first-order component of the output light from the MZ interferometer becomes minimum. Further, the bias voltage may be adjusted so that the second-order component of the output light from the MZ interferometer becomes maximum. As a result, the phase difference between the bias voltages to be applied to the two arms of the MZ interferometer can be zero easily.

The step of measuring output intensity is a step of measuring output intensity from an MZ interferometer system whose bias voltage is adjusted at the bias voltage adjusting step. This step is basically similar to that according to the first aspect.

The step of evaluating characteristics is a step of evaluating the characteristics of the MZ interferometer by using the intensity of the second-order sideband component in the output from the MZ interferometer measured at the output intensity measuring step.

The method according to the second aspect is for evaluating the characteristics of the MZ interferometer without using the zeroth-order component included in the output light. For this reason, the characteristics of a certain MZ interferometer in the optical modulator including a plurality of MZ interferometers can be effectively evaluated.

In a preferable pattern of the method according to the second aspect, the above-described MZ interferometer is a first MZ interferometer. In this case, the optical modulator further includes a second MZ interferometer. The second MZ interferometer is different from the first MZ interferometer.

According to the present invention, the characteristics of a certain MZ interferometer in the optical modulator including a plurality of MZ interferometers can be effectively evaluated.

A preferable pattern of the method according to the second aspect is that the method evaluates the character, $\eta$, that relates to imbalance of light amplitude between the two arms.

The imbalance of light amplitude between the two arms is an important factor for the character of MZ interferometer. Thus if we obtain $\eta$ or $\eta$ related value then we could modify MZ interferometer suitably. This pattern may apply all of the features described above.

A preferable pattern of the method according to the second aspect is that the method evaluates a chirp parameter and a modulation index.

The chirp parameter (alpha) is an important factor for the character of MZ interferometer. Thus if we obtain alpha or alpha related value then we could modify MZ interferometer suitably. The modulation index is also an important factor for the character of MZ interferometer. This pattern may apply all of the features described above.

In a preferable pattern of the method according to the first aspect, RF signals are applied to the two arms of the MZ interferometer and skew (phase difference) is provided to the RF signals, so that the accurate bias-null state is confirmed. When the accurate bias-null state is not obtained, the bias is adjusted. In such a manner, the accurate bias-null state can be obtained, so that the characteristics of the MZ interferometer can be accurately evaluated. This is described below.

When the RF signals are applied to the two arms of the MZ interferometer, skew (phase difference) occasionally occurs in the RF signals. Due to the skew, light spectrum changes. For this reason, normally adjustment is made so that the skew becomes as small as possible. On the other hand, when a state that the light spectrum changes due to the skew is actually measured, it is found that every order component has periodicity (symmetric property). That is, an n-order component has a zero point in $2\pi/n$ cycle. As a result, the n-order component can be easily separated from the output spectrum. The output spectrum has the periodicity for the following reasons. That is, when B represents a bias phase difference and $\phi$ represents the skew, the intensity of the n-order component is proportional to $\cos[\{n(\phi+\pi)+B\}/2]$. For this reason, it is considered that the n-order component has the zero point in $2\pi/n$ cycle.

As a result of actual output, an upper sideband (USB) and a lower sideband (LSB) are imbalanced at a bias point between bias null and bias full. On the other hand, a symmetric property is maintained between USB and LSB in bias full or bias null. That is, the intensities of USB and LSB are approximately equal to each other even when the skew changes.

Figure 4:
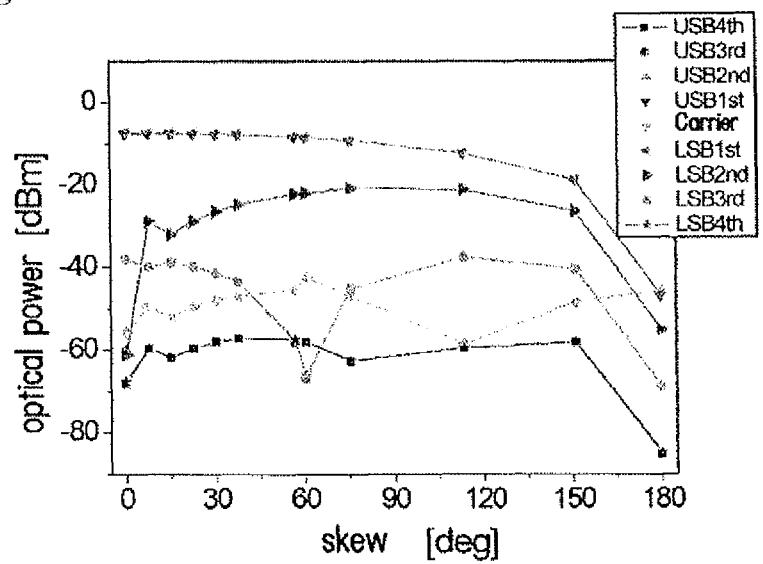
FIG. 4 is a graph instead of a diagram illustrating a relationship between the output from the MZ interferometer and the skew in the case of bias null.

FIG. 4 is a graph instead of a diagram illustrating a relationship between the output from the MZ interferometer and the skew in the case of bias null (null bias). FIG. 4 illustrates the output from the MZ interferometer in the case of DSB-SC modulation. In FIG. 4, it is found that even when the skew changes, the carrier component is continuously suppressed. When the skew becomes 180°, the light intensity reduces as a whole. This is considered to be because optical phases are inverted between the two arms. That is, components whose phases are inverted interfere with each other and are cancelled, thereby weakening the entire light intensity. The first-order component (and minus first-order component) becomes maximum when the skew is 0°, and becomes minimum when the skew becomes 180°. An interval between the zero points is 360° ($2\pi$). The intensities of the first-order component and the minus first-order component are approximately equal to each other in each skew, and the symmetric property is maintained between the first-order component and the minus first-order component. The second-order component (minus second-order component) becomes minimum when the skew is 0°, and becomes minimum when the skew is 180°. The interval between the zero points is 180° ($2\pi/2$). The intensities of the second-order component and the minus second-order component are approximately equal to each other in each skew, and the symmetric property is maintained between the second-order component and the minus second-order component. The third-order component (minus third-order component) becomes maximum when the skew is 0°, and becomes infinitesimal when the skew is 60° and 180°. The interval between the zero points is 120° ($2\pi/3$). The intensities of the third-order component and the minus third-order component are approximately equal to each other at each skew, and the symmetric property is maintained between the third-order component and the minus third-order component.

Figure 5:
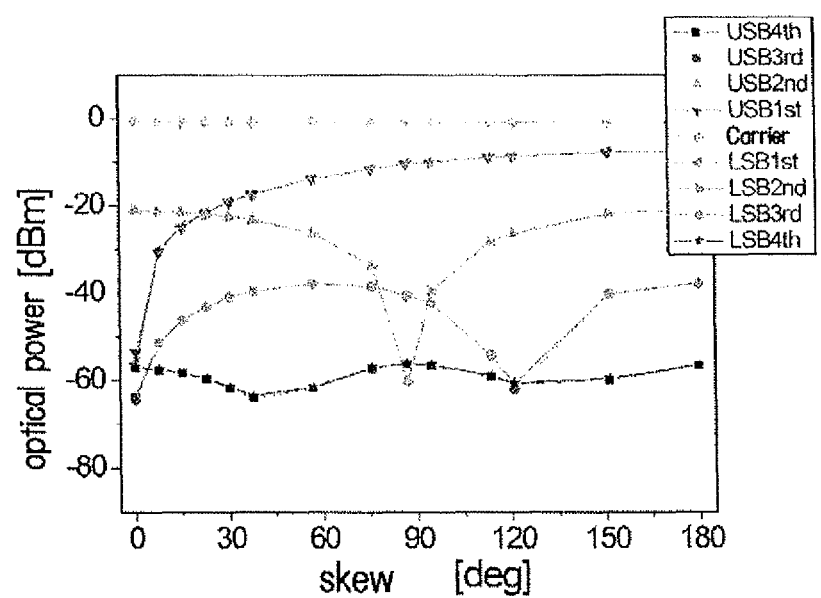
FIG. 5 is a graph instead of a diagram illustrating a relationship between the output from the MZ interferometer and the skew in the case of bias full.

FIG. 5 is a graph instead of a diagram illustrating a relationship between the output from the MZ interferometer and the skew in the case of bias full (full bias). FIG. 5 illustrates the output from the MZ interferometer in the case where odd-order components are suppressed. In FIG. 5, it is found that even when the skew changes, the intensity of the carrier component does not change. When the skew increases from 0, the intensity of the suppressed first-order component (and minus first-order component) increases. The first-order component (and minus first-order component) becomes maximum when the skew is 0°, and becomes minimum when the skew becomes 180°. An interval between the zero points is 360° ($2\pi$). The intensities of the first-order component and the minus first-order component are approximately equal to each other in each skew, and the symmetric property is maintained between the first-order component and the minus first-order component. The second-order component (minus second-order component) becomes minimum when the skew is 0°, and becomes minimum when the skew is 90°. The interval between the zero points is 180° ($2\pi/2$). The intensities of the second-order component and the minus second-order component are approximately equal to each other in each skew, and the symmetric property is maintained between the second-order component and the minus second-order component. The third-order component (minus third-order component) becomes maximum when the skew is 0°, and becomes infinitesimal when the skew is 120°. The interval between the zero points is 120° ($2\pi/3$). The intensities of the third-order component and the minus third-order component are approximately equal to each other at each skew, and the symmetric property is maintained between the third-order component and the minus third-order component.

Therefore, when a difference between the intensity of USB and the intensity of LSB is in a constant range, it can be determined that bias null or bias full is achieved. The constant range may be suitably set. When this range is narrow, the bias null or the bias full can be achieved more accurately.

That is, in a preferable pattern from the second aspect, the step of setting the phase difference between the bias voltages to be applied to the two arms of the MZ interferometer to $\pi$ includes a step of applying signals having skew to the two arms. The skew is a phase difference between RF (Radio Frequency) signals (modulation signals) to be applied to the two arms. The skew may be controlled in the following manner. That is, an RF signal source is connected to the control device. The RF signal source is connected to an electrode for applying the modulation signals to the two arms. The control section gives a command for causing the RF signal source to output the RF signals. This command takes the phase difference between the RF signals to be applied to the two arms into consideration. As a result, the phase difference (skew) between the RF signals to be applied to the two arms can be controlled. Further, the control section sweeps the phase difference so as to be capable of sweeping the skew (namely, the phase difference between the RF signals to be applied to the two arms). While the skew is being swept, the outputs from the MZ interferometer are measured. In this state, a determination is made whether the symmetric property is maintained between the measured outputs from the MZ interferometer. The light detector is connected to the control device. Therefore, the output spectrum detected by the light detector is input into the control device.

The control device separates respective order components from the output spectrum. The control device determines whether the n-order component and the minus n-order component have the similar intensity. For example, a ratio between the intensity of the first-order component and the intensity of the minus first-order intensity is obtained, and a determination is made whether this ratio is 0.95 or more and 1.05 or less. This range may be suitably adjusted. As a result, the determination is made whether the symmetric property is maintained between the outputs from the MZ interferometer.

When the determination is made that the symmetric property is maintained between the outputs from the MZ interferometer, a determination is made that the phase difference between the bias voltages is $\pi$. As a result, the bias point can be confirmed as being accurately bias null.

In a preferable pattern of the invention according to the second aspect, the step of setting the phase difference between the bias voltages to be applied to the two arms of the MZ interferometer to $\pi$ (pi) includes a step of applying signals having skew to the two arms. The outputs from the MZ interferometer at the time of sweeping the skew are measured. Further, the step includes a step of determining whether a difference between the intensity of the first-order component and the intensity of the minus first-order component in the measured outputs from the MZ interferometer is within a constant range. That is, if the first-order component and the minus first-order component maintain the similar intensity even when the skew changes, the symmetric property is maintained between the first-order component and the minus first-order component. Therefore, according to this pattern, the accurate bias null can be confirmed.

In a preferable pattern of the invention according to the second aspect, the step of setting the phase difference between the bias voltages to be applied to the two arms of the MZ interferometer to π (pi) includes a step of applying signals having skew to the two arms. The outputs from the MZ interferometer at the time of sweeping the skew are measured. Further, the step includes a step of determining whether a difference between the intensity of the second-order component and the intensity of the minus second-order component in the measured outputs from the MZ interferometer is within a constant range. That is, if the second-order component and the minus second-order component maintain the similar intensity even when the skew changes, the symmetric property is maintained between the second-order component and the minus second-order component. Therefore, according to this pattern, the accurate bias null can be confirmed.

In a preferable pattern of the method according to the second aspect, the bias-null state is accurately obtained by using skew. Basically, similarly to the principle described in the first aspect, the bias-null state can be accurately achieved. Specifically in this pattern, the step of setting the phase difference between the bias voltages to be applied to the two arms of the MZ interferometer to 0 includes a step of applying signals having skew to the two arms. The skew is a phase difference between RF (Radio Frequency) signals (modulation signals) to be applied to the two arms. The skew (namely, the phase difference between the RF signals to be applied to the two arms) is swept. While the skew is being swept, outputs from the MZ interferometer are measured. In this state, a determination is made whether the measured outputs from the MZ interferometer maintain a symmetric property. When the determination is made that the outputs from the MZ interferometer maintain the symmetric property, a determination is made that the phase difference between the bias voltages is 0. On the other hand, when the determination is made that the outputs from the MZ interferometer do not maintain the symmetric property, the determination is made that the phase difference between the bias voltages is not 0. As described later, in such a manner, it can be confirmed that the bias point is accurately bias full.

In a preferable pattern of the method according to the second aspect, the step of setting the phase difference between the bias voltages to be applied to the two arms of the MZ interferometer to 0 includes a step of applying signals having skew to the two arms. Outputs from the MZ interferometer in the case of sweeping the skew are measured. This step includes a step of determining whether a difference between the intensity of a first-order component and the intensity of a minus first-order component in the measured outputs from the MZ interferometer is in a constant range. That is, when the first-order component and the minus first-order component maintain the similar intensity even if the skew changes, the symmetric property between the first-order component and the minus first-order component is maintained. Therefore, according to this pattern, the bias full can be accurately confirmed.

In a preferable pattern of the method according to the second aspect, the step of setting a phase difference between the bias voltages to be applied to the two arms of the MZ interferometer includes the step of applying the signals having skew to the two arms. Outputs from the MZ interferometer in the case of sweeping the skew are measured. This step further includes a step of determining whether the difference between the intensity of a second-order component and the intensity of a minus second-order component in the measured outputs from the MZ interferometer is in a constant range. That is, when the second-order component and the minus second-order component maintain the similar intensity even if the skew changes, the symmetric property between the second-order component and the minus second-order component is maintained. Therefore, according to this pattern, the bias full can be accurately confirmed.

When $\eta$ is not variable, the characteristics of the Mach-Zehnder interferometer may be evaluated in the following manner. The intensities of respective sidebands in the bias-full and bias-null states are measured. In this case, the respective intensities (relative value) can be expressed by the formulas shown above. Therefore, a plurality of simultaneous nonlinear equations can be written by using these data. When the simultaneous equations whose number is larger than variables are written so that the variables can be obtained. Therefore, three or more simultaneous equations are written, and are solved so that A, $\alpha$ and $\eta$ can be obtained. As described before, when a plurality of MZ interferometers are provided, noises originating from the MZ interferometers other than the one to be measured are generated in a zeroth-order component. Therefore, in order to evaluate the MZ interferometer, it is desirable to use a ratio between the first-order, second-order or third or more-order sideband components. The nonlinear simultaneous equations occasionally have a plurality of solutions. In this case, four or more simultaneous equations are written so that the solutions can be easily obtained.

A method according to the third aspect includes a step of adjusting bias voltage, a step of measuring output intensity, and a step of evaluating characteristics. At the step of adjusting bias voltage, a voltage is set to be in the middle of a voltage with which a phase difference between the bias voltages to be applied to the two arms of the MZ interferometer becomes 0 and a voltage with which the phase difference becomes π (pi). As to the method for obtaining the voltages whose phase difference becomes 0 and π (pi), the above-described methods may be suitably used. Further, the optical modulator may be automatically controlled by using the control device. The control device gives a command to the bias source so that the voltages whose phase difference becomes 0 and becomes π (pi) are stored, their average is obtained, and a bias voltage of this average value is output. At the step of measuring output intensity, intensities of high-order components included in the output light from the MZ interferometer are obtained. At the step of evaluating characteristics, the characteristics of the MZ interferometer are evaluated by using a ratio between the high-order components measured at the output intensity measuring step. That is, according to the present invention, the characteristics of the MZ interferometer can be evaluated by using an intermediate state between bias full and bias null. In this case, the intensities of the respective sidebands become the average expressed by the above formula. Therefore, the sideband intensities of the first or more-order components (high-order components) are obtained, and a simultaneous equation is written by using the ratio, so that a variable may be obtained. The variable is a value representing the characteristics of the MZ interferometer. Also in this aspect, the optical modulator including a plurality of MZ interferometers can be effectively evaluated. The method according to the third aspect may be also controlled automatically. A system having such an optical modulator includes an optical modulator, a light detector, a power source, and a control device. The power source applies a modulation signal and a bias voltage to the optical modulator. The light detector is configured to measure the output from the optical modulator or the output from the MZ interferometer included in the optical modulator. The control device is connected to the light detector, and can receive spectrum information detected by the light detector. Further, the control device controls an operation of the power source based on the received spectrum information.

When the phase difference between the RF signals between the arms cannot be ignored, the phase difference between the RF signals may be evaluated as follows. That is, characteristics may be evaluated by using the above-described intermediate state between bias full and bias null. That is, when the phase difference between the RF signals between the arms cannot be ignored, the intensity of +n-order components and the intensity of −n-order components are imbalanced in the bias voltage between bias full and bias null. The phase difference between the RF signals between the arms can be evaluated by using the ratio between the +n-order components and the −n-order components. That is, when the ratio takes a value in a constant range near 1, the phase difference between the RIA signals between the arms can be ignored. On the other hand, when the ratio between the +n-order components and the −n-order components shifts from 1, the phase difference is large by this shift. That is, the ratio between the +n-order components and the −n-order components is obtained in the intermediate state between bias full and bias null, so that the phase difference between the RF signals between the arms can be evaluated.

INDUSTRIAL APPLICABILITY

The present invention is suitably used in the field of optical information communication.

The invention claimed is:

1. A method for evaluating characteristics of an optical modulator including a first Mach-Zehnder, MZ, interferometer,
    wherein the MZ interferometer includes a branching section, two arms, a coupling section, and electrodes,
        the two arms are connected to the branching section,
        the coupling section is connected to the two arms,
        the electrodes make it possible to apply bias voltages to the two arms,
        the electrodes make it possible to apply modulation signals to the two arms,
    wherein the method comprises a step of applying driving signal, a step of adjusting bias voltage, a step of measuring output intensity and a step of evaluating characteristics,
    wherein the step of applying driving signal is a step of applying driving signal to an MZ interferometer,
    wherein the step of adjusting bias voltage is a step of setting phase difference between the bias voltages to be applied to two arms of the MZ interferometer to it or a step of setting the phase difference between the bias voltages to be applied to the two arms of the MZ interferometer to 0,
    wherein the step of measuring output intensity is a step of measuring the output intensity from the MZ interferometer whose bias voltage is adjusted at the step of adjusting a bias voltage, and
    wherein the step of evaluating characteristics is a step of evaluating characteristics of the MZ interferometer using intensity of the sideband component of the second-order component in the output from the MZ interferometer measured at the step of measuring the output intensity.

2. The method in accordance with claim 1,
wherein the optical modulator further comprises a second MZ interferometer, and
the second MZ interferometer is different from the first MZ interferometer.

3. The method in accordance with claim 1,
wherein the characteristics of the MZ interferometer includes imbalance of light amplitude between the two arms.

4. The method in accordance with claim 1,
wherein the characteristics of the MZ interferometer includes a chirp parameter and a modulation index.

5. The method in accordance with claim 1,
wherein the step of setting phase difference between the bias voltages to be applied to two arms of the MZ interferometer to $\pi$ comprises:
    a step of applying signals having skew to the two arms;
    a step of measuring output signal from the MZ interferometer when the skew is swept;
    a step of determining whether the output signal maintains symmetric property; and
    a step of determining a phase difference between bias voltages, the phase difference being assessed as $\pi$ when the output signal maintains symmetric property and the phase difference being assessed as not $\pi$ the output signal does not maintain symmetric property.

6. The method in accordance with claim 1,
wherein the step of setting phase difference between the bias voltages to be applied to two arms of the MZ interferometer to $\pi$ comprises:
    a step of applying signals having skew to the two arms;
    a step of measuring output signal from the MZ interferometer when the skew is swept;
    a step of determining whether the output signal maintains symmetric property; and
    a step of determining whether a difference between the intensity of a first-order component and the intensity of a minus first-order component in the signals output from the MZ interferometer is within a predetermined range.

7. The method in accordance with claim 1,
wherein the step of setting phase difference between the bias voltages to be applied to two arms of the MZ interferometer to $\pi$ comprises:
    a step of applying signals having skew to the two arms;
    a step of measuring output signal from the MZ interferometer when the skew is swept;
    a step of determining whether the output signal maintains symmetric property; and
    a step of determining whether a difference between the intensity of a second-order component and the intensity of a minus second-order component in the signals output from the MZ interferometer is within a predetermined range.

8. The method in accordance with claim 1,
wherein the step of setting the phase difference between the bias voltages to be applied to the two arms of the MZ interferometer to 0 includes:
    a step of applying signals having skew to the two arms,
    a step of deciding whether the symmetric property is maintained between the measured outputs from the MZ interferometer,
    a step of determining the phase difference between the bias voltages is 0 when the symmetric property is maintained between the outputs from the MZ interferometer, and the phase difference between the bias voltages is not 0 when the symmetric property is not maintained between the outputs from the MZ interferometer.

9. The method in accordance with claim 1,
wherein the step of setting the phase difference between the bias voltages to be applied to the two arms of the MZ interferometer to 0 includes:
- a step of applying signals having skew to the two arms;
- a step of measuring the outputs from the MZ interferometer at the time of sweeping the skew; and
- a step of deciding whether the difference between the intensity of the first-order component and the intensity of the minus first-order component in the outputs from the MZ interferometer is within a predetermined range.

10. The method in accordance with claim 1,
wherein the step of setting the phase difference between the bias voltages to be applied to the two arms of the MZ interferometer to 0 includes:
- a step of applying signals having skew to the two arms;
- a step of measuring the outputs from the MZ interferometer at the time of sweeping the skew; and
- a step of deciding whether the difference between the intensity of the second-order component and the intensity of the minus second-order component in the outputs from the MZ interferometer is within a predetermined range.

11. The method in accordance with claim 1,
wherein the step of evaluating characteristics is a step of evaluating characteristics of the MZ interferometer further using intensities of components of the first order component, the third-order component and the fourth order component in output from the MZ interferometer measured at the step of measuring output intensity.

* * * * *